J. HARRIS.
ACETYLENE GENERATOR.
APPLICATION FILED JAN. 18, 1912.
1,113,336.
Patented Oct. 13, 1914.
2 SHEETS—SHEET 1.
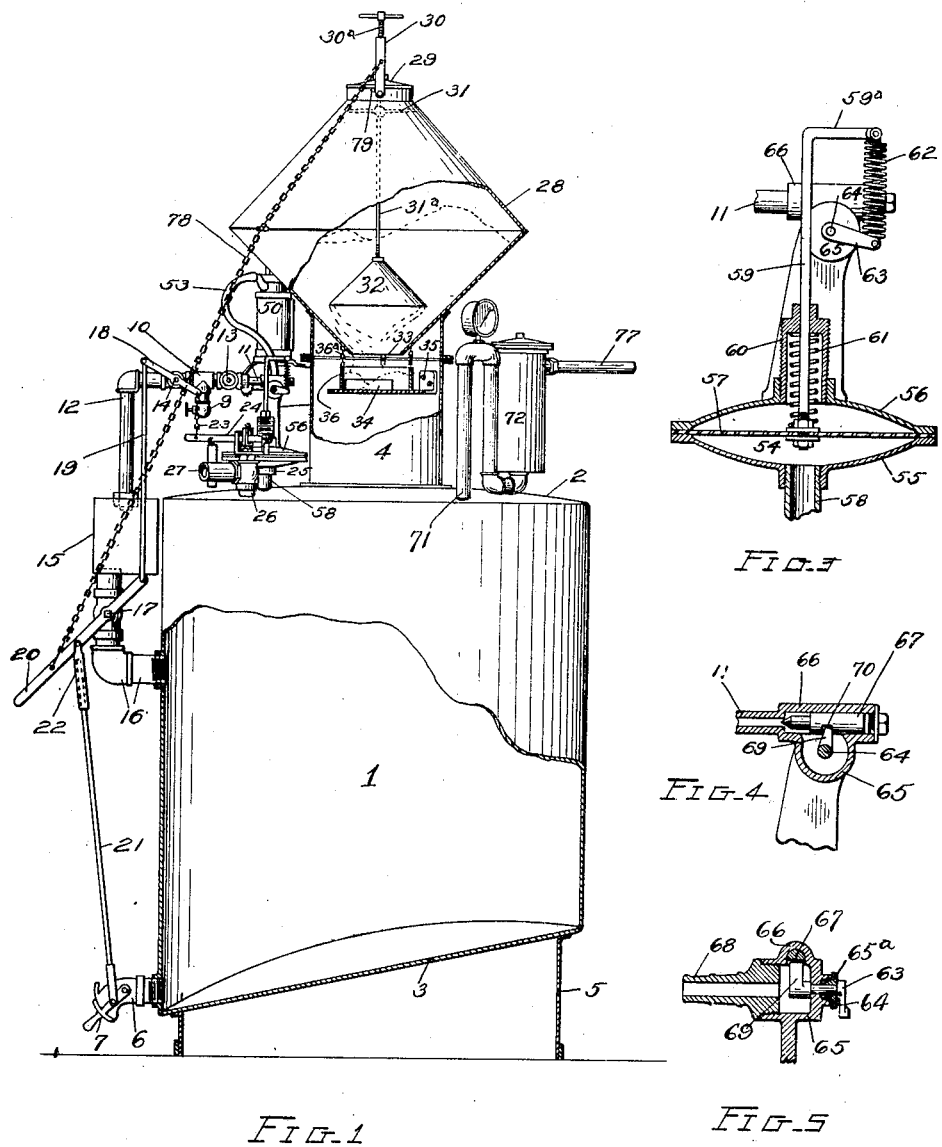

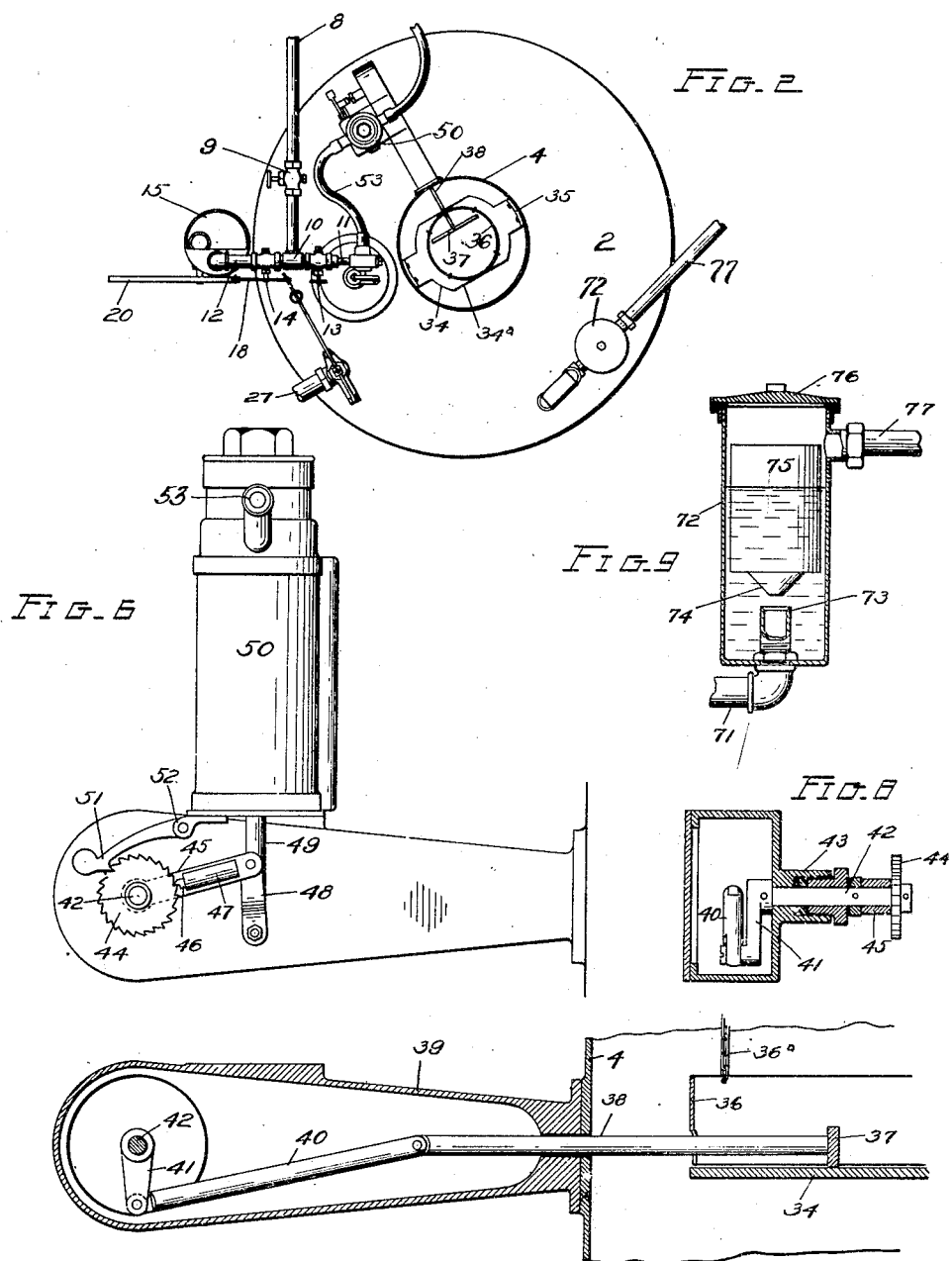

UNITED STATES PATENT OFFICE.

JOHN HARRIS, OF CLEVELAND, OHIO.

ACETYLENE-GENERATOR.

1,113,336. Specification of Letters Patent. Patented Oct. 13, 1914.

Application filed January 18, 1912. Serial No. 671,856.

*To all whom it may concern:*

Be it known that I, JOHN HARRIS, a citizen of the United States, residing at Cleveland, in the county of Cuyahoga and State of Ohio, have invented a certain new and useful Improvement in Acetylene - Generators, of which the following is a full, clear, and exact description, reference being had to the accompanying drawings.
This invention relates to apparatus for generating acetylene gas, and has for its general object to provide an apparatus wherein the feed of the carbid to the water is effected positively and automatically.
The apparatus disclosed herein is especially designed with the view of generating and supplying high pressure gas such as is used with blow pipes for so-called "autogenous welding." Generally speaking the invention may be further defined as consisting of the combinations of elements embodied in the claims hereto annexed and illustrated in the drawings forming part hereof wherein—
Figure 1 represents an elevation with parts broken away of a generator constructed in accordance with my invention. Fig. 2—a sectional view corresponding substantially to the line 2—2 of Fig. 1. Fig. 3—a vertical sectional view of the motor regulator. Figs. 4 and 5—sectional details of the valve mechanism controlling the flow of fluid to the pump or motor. Fig. 6—an elevation of the motor and parts connected thereto for feeding carbid to the generator. Fig. 7—a sectional detail of the carbid feed mechanism, certain parts being shown by elevation. Fig. 8—a sectional detail of a portion of the aforesaid feed mechanism, and Fig. 9—a vertical sectional view of the cut-off valve chamber in the gas line.

Describing by reference characters the various parts illustrated herein 1 denotes the generator, the same comprising an upright tank having a cover 2, an inclined bottom 3 and a centrally arranged upwardly projecting neck 4. The inclined bottom of the generator is supported on a suitable base 5, the generator overhanging this base and being provided just above the lower end of its sloping bottom with a spout 6 having a valve provided with an operating handle 7.

8 denotes a water-supply pipe having therein a controlling valve 9 and connected to a T 10, from which extends the branches 11 and 12, controlled respectively by valves 13 and 14. The branch 12 extends downwardly to a point slightly below the top of the generator tank, where it discharges into an open top receptacle 15. From the bottom of this receptacle a filling pipe 16 extends into the generator tank and is provided with a valve 17. The stem of the valve 14 is connected to and operated by a lever 18, one end of which is connected by a link 19 with a lever 20, which is connected with the valve 17.

21 denotes a rod which is pivotally connected at one end to the operating handle 7, the other end of said rod being telescoped within a tube 22, which in turn is pivotally connected to the lever 20, the parts 21 and 22 forming an extensible and contractible link or lost motion connection between the lever 20 and the handle 7. The end of the lever 18 opposite that to which the link 19 is connected is provided with a flexible device 23, as a chain, by which such lever end is connected to the weighted lever arm 24 of a safety valve 25, said safety valve communicating with the top of the generator by means of a pipe connection 26 and being provided with a discharge outlet pipe 27 whereby the pressure within the generator may be automatically relieved, should such pressure become excessive. The pipe 27 extends outside of the apartment in which the generator is located, so that any gas discharged from the safety valve will not accumulate within such apartment.

Supported by the top of the neck 4 is the carbid receptacle 28, the same being in the shape of a double cone, the lower portion of the receptacle projecting downwardly into the neck 4. The upper end of the receptacle is provided with a cover 29 and a pivoted yoke 30, through which extends a stem 30ª, the lower end of which bears against the cover to hold the same seated. A suitable cross-bar 31 in the upper portion of the receptacle 28 supports a stem 31ª having a conical deflector 32 at its lower end, the parts being so arranged that an annular space is provided between the bottom of the deflector and the adjacent inclined surface of the receptacle 28 through which annular space nut carbid may be discharged through the mouth 33 of the receptacle. Mounted below the outlet 33 of this receptacle is a shelf 34 which is generally circular in shape and is conveniently formed of metal being supported from the neck by means of oppositely arranged flanges 35 riveted to said neck. (See Fig. 2.) Suspended by flexible devices 36ª from the lower portion of the receptacle 28 is a ring 36 of a smaller diameter than the shelf 34 and having its lower edge supported slightly above such shelf, so as to just clear the same. Diametrically opposite sides of the shelf are cut away, as shown at 34ª, preferably on lines substantially parallel to the diameter which bisect the flanges 35. The diameter of the ring 36 is substantially equal to the shorter diameter of the shelf, whereby it will prevent carbid from rebounding from the shelf during the charging operation.

The carbid fed from the receptacle 28 accumulates within the ring 36 upon the shelf 34 and is automatically discharged from the shelf into the generator by the following construction:—37 denotes a pusher which is mounted upon the shelf 34 and is provided with a stem 38 which projects through the wall of the neck 4 and into a casing 39, where it is connected by means of a link 40 with a crank 41 projecting from a transverse shaft 42. (See Fig. 7.) The shaft 42 extends through a suitable stuffing box 43 having a packing ring 43ª therein and is provided with a ratchet wheel 44 at one end thereof. Sleeved upon the shaft 42 is an arm 45 which carries a pawl 46, mounted within a cylinder 47 on said arm. The pawl may be pressed by a spring in the casing (not shown) so as to be held in engagement with the teeth of the ratchet 44. The free end of the arm 45 is connected by means of a link 48 with a piston rod 49 of a fluid motor, the motor illustrated herein being of the conventional pump type, the casing of the pump being illustrated at 50. A detent pawl 51 pivotally supported in any convenient manner, as from a bracket 52 carried by the pump casing, overhangs the ratchet 44 and prevents rotation of the same while the pawl 46 is being shifted prior to advancing the ratchet and shaft. The pump is driven by water supplied through the pipe 8, a hose or similar flexible conduit 53 connecting the branch 11 with the pump casing.

For the purpose of making the operation of the motor dependent upon pressure conditions within the generator, the following construction is provided: 54 denotes the casing of a pressure regulator, said casing comprising a pair of concavo convex plates 55 and 56 having clamped therebetween a flexible diaphragm 57, the plate 55 being connected to the generator by means of a pipe 58, whereby the diaphragm is exposed to the pressure conditions within the generator. A stem 59 is connected to and extends upwardly from the diaphragm 57, the stem passing through a sleeve 60, which is threaded into the top of the plate 56 and guides the stem and forms a receptacle for a helical spring 61, one end of which bears against the outer end of the sleeve and the other end of which bears against the diaphragm. The stem 59 has at its upper end a substantially horizontal extension 59ª which is connected by means of a spring 62 with a crank arm 63, the inner end of the arm being connected to a shaft 64. This shaft projects into a casing 65 through a stuffing box 65ª, the casing merging with a valve casing 66, having therein a reciprocating needle valve 67, controlling the flow of water from the supply branch 11 into the casing 66 and thence, by means of the connection 68, into the pipe 53.

For the purpose of operating the valve 67, the shaft 64 is provided with an arm 69 which projects into a slot 70 in the valve 67, whereby the valve may be moved by the oscillation of the shaft 64. From this construction it will be apparent that, when the pressure within the generator becomes excessive, the diaphragms 57 will be flexed upwardly, thereby closing the valve 67 and shutting off the flow of the actuating fluid to the motor, with the result that the feed of carbid will at such time be interrupted or cut off. The spring 62 protects the valve 67, the valve seat and the connecting parts against injury due to an increase in pressure on the diaphragm after the closing of the valve and until the diaphragm is flexed into contact with the cover plate 56.

From the top of the generator extends the supply pipe 71. This pipe extends substantially to the level of the upper end of a valve casing 72, and is then directed downwardly and is connected with the bottom of said casing. The pipe projects upwardly through the bottom of the casing and is provided at its upper end with a beveled seat 73 for the reception of a frusto-conical valve 74, carried by a float 75, the casing 72 having a removable cap 76. From the upper end of the casing 72 the supply pipe 77 extends to the point of use. By this construction it will be impossible for gases to pass back into the generator. An important field for acetylene generators is in connection with oxy-acetylene blow pipes. In operation, should the outlet of the blowpipe or burner become clogged, the pressure in the oxygen supply is apt to force oxygen backward into the acetylene pipe against the lower pressure therein. This back flow in the acetylene pipe, as well as propagation of flame therethrough, will be arrested and prevented by the seating of the valve 74 and the water in the receptacle 72.

The yoke 30 is connected by a chain 78 with the lever 20, and a stop pin 79 prevents the yoke 30 from being swung toward that side of the apparatus from which the lever 20 projects, making it necessary to lift the outer end of the lever 20 and open the valve 25 and vent the generator before the yoke 30 can be swung in a direction to permit the removal of the cover 29 preliminarily to filling the receptacle 28.

From the detailed description and the drawings, it is believed that the operation of the apparatus will be clear. When the parts are in the positions shown in Fig. 1, the supply of water from the pipe 8 to the generator connection 12 is cut off by means of the valve 14. Furthermore, any escape of gas from the generator through the overflow receptacle 15 is prevented by means of the valve 17, which is also closed. The operations of filling the receptacle 28 and of cleaning the generator can be accomplished only by operating the lever 20 in a direction to open the valves 14 and 17, and this opening movement of the valves results in lifting the valve 25 from its seat, allowing the generator to be vented at a point outside the apartment in which the generator is located during the filling and draining operations. It will be understood that, when the generator tank is drained, the valve 9 will be closed.

Supplying water through a conduit, including the overflow receptacle 15 prevents the water in the generator tank from reaching an undesirable height. Still further the automatic venting of the apparatus permits the tank to be filled quickly with water.

The carbid delivered upon the shelf 34 is retained on said shelf by the ring 36, except as it is positively fed from said shelf by the operation of the push rod 38.

The purpose and operation of the pressure regulator and the float chamber 72 have been explained at length hereinbefore, except as to the adjustability of the sleeve 60. The purpose of making this sleeve adjustable toward and from the diaphragm is to vary the pressure under which the motor will operate.

Having thus described my invention, what I claim is:

1. In an acetylene generator, the combination of a tank, a carbid receptacle thereabove, a shelf interposed between said receptacle and said tank, a ring suspended from the receptacle above said shelf and having its lower edge in close proximity to said shelf to form a carbid retaining wall thereabove, a feeding revice within said ring, and means for reciprocating said device.

2. In an acetylene generator, the combination of a tank, a carbid receptacle thereabove, a neck connecting the same, a substantially circular shelf interposed between said receptacle and said tank in said neck, a ring suspended from the receptacle above said shelf, opposite portions of the shelf being cut away to provide clearance between the shelf and the neck, a reciprocable feeding device arranged to travel in the direction of said cut-away portions, and power operated means for reciprocating said device.

3. In an acetylene generator, the combination of a tank, a carbid receptacle thereabove, a shelf interposed between said tank and said receptacle, a ring suspended above said shelf and having its lower edge in close proximity to said shelf to form a carbid retaining wall thereabove, and a device within said ring for feeding carbid from said shelf into said tank.

4. In an acetylene generator, the combination of a tank, a carbid receptacle thereabove, a shelf interposed between the receptacle and the tank, a ring flexibly suspended above said shelf and having its lower edge in close proximity to said shelf to form a carbid retaining wall thereabove, and a feeding device in said ring having an operating rod extending through the wall of and outside the ring.

In testimony whereof, I hereunto affix my signature in the presence of two witnesses.

JOHN HARRIS.

Witnesses:
J. B. HULL,
BRENNAN B. WEST.